(12) United States Patent
Baba (10) Patent No.: US 9,896,148 B2
(45) Date of Patent: Feb. 20, 2018

(54) COLLAPSIBLE TWO-WHEELED VEHICLE

(71) Applicant: DESIGN UNLTD INC., Tokyo (JP)

(72) Inventor: Kazuhisa Baba, Tokyo (JP)

(73) Assignee: DESIGN UNLTD INC., Tokyo (JP)

( * ) Notice: Subject to any disclaimer, the term of this patent is extended or adjusted under 35 U.S.C. 154(b) by 251 days.

(21) Appl. No.: 14/779,795

(22) PCT Filed: Sep. 14, 2015

(86) PCT No.: PCT/JP2015/076064
§ 371 (c)(1),
(2) Date: Sep. 24, 2015

(87) PCT Pub. No.: WO2017/046856
PCT Pub. Date: Mar. 23, 2017

(65) Prior Publication Data
US 2017/0253288 A1 Sep. 7, 2017

(51) Int. Cl.
*B62K 15/00* (2006.01)
*B62K 3/02* (2006.01)
(Continued)

(52) U.S. Cl.
CPC ........... *B62K 15/00* (2013.01); *B62J 1/00* (2013.01); *B62K 3/02* (2013.01); *B62K 21/02* (2013.01)

(58) Field of Classification Search
CPC ...... B62D 61/06; B62D 57/024; B62K 15/00; B62K 2015/001; B62K 2015/003
See application file for complete search history.

(56) References Cited

U.S. PATENT DOCUMENTS 3,316,993 A * 5/1967 Weitzner .............. A45C 5/14
180/208
4,389,055 A * 6/1983 Cockburn ............. B62K 3/02
280/259
(Continued)

FOREIGN PATENT DOCUMENTS

FR 2987815 A * 3/2012 ............ B62K 15/00
JP S50-35812 Y2 10/1975
(Continued)

OTHER PUBLICATIONS

International Search Report of corresponding application No. PCT/JP2015/076064 dated Dec. 8, 2015, 10pgs.
(Continued)

*Primary Examiner* — Kevin Hurley
(74) *Attorney, Agent, or Firm* — Maier & Maier, PLLC (57) ABSTRACT

Provided is a thin collapsible two-wheeled vehicle including: a pair of left and right mounting members provided to the main body frame to mount the rear wheel; wherein the pair of mounting members are each provided with a through hole penetrating each of the pair of mounting members respectively in left and right directions of the mounting members; the main body frame has a storage room therein, the storage room capable of storing the front wheel, the rear wheel, the saddle, and the handle; the rear wheel has an axle capable of moving within the through hole between a first mounting position and second mounting position; the rear wheel protrudes from the main body frame when the axle is mounted at the first mounting position, and the rear wheel is stored in the main body frame when the axle is mounted at the second mounting position.

8 Claims, 12 Drawing Sheets

(51) Int. Cl.
*B62J 1/00* (2006.01)
*B62K 21/02* (2006.01)

(56) References Cited

U.S. PATENT DOCUMENTS

| | | | |
|---|---|---|---|
| 5,097,922 A * | 3/1992 | Stagi | B62K 15/006 180/208 |
| 6,273,442 B1 * | 8/2001 | Fallon | B62K 15/008 280/287 |
| 6,425,598 B2 | 7/2002 | Murayama | |
| 7,815,208 B1 | 10/2010 | Lin | |
| 2010/0253040 A1 | 10/2010 | Lin | |

FOREIGN PATENT DOCUMENTS

| | | |
|---|---|---|
| JP | S58-48396 B2 | 7/1981 |
| JP | S62-27497 Y2 | 10/1984 |
| JP | 08-290791 A | 11/1996 |
| JP | 2001-171586 A | 6/2001 |
| JP | 2002-504461 A | 2/2002 |
| WO | 99/43538 A1 | 9/1999 |

OTHER PUBLICATIONS

Japanese Office Action dated Apr. 4, 2017, in connection with corresponding JP Application No. 2015-548105 (8 pages, including English translation).

* cited by examiner

COLLAPSIBLE TWO-WHEELED VEHICLE

TECHNICAL FIELD

The present invention relates to a collapsible two-wheeled vehicle, and particularly relates to a collapsible two-wheeled vehicle capable of storing wheels, a saddle, a handle and the like in the frame of the collapsible two-wheeled vehicle in a collapsed state, thereby allowing compact storage of the collapsible two-wheeled vehicle.

BACKGROUND

Recently, usage of bicycles as a transporting means with low environmental, load has been spreading. Among them, development of collapsible bicycles with various mechanisms to make the bicycle compact for convenient carriage and storage has been made.

In many of the collapsible bicycles, the frame is separated in the middle portion, allowing the bicycle to be folded in half at the middle portion (for example, refer to Patent Literature 1). Accordingly, the length of the bicycle in the front-rear direction can be shortened when the bicycle is folded (stored). Meanwhile, the bicycle disclosed in Patent Literature 2 is structured so as to store the wheels in between two opposing side panels by allowing the wheels to pivot around an axis parallel with respect to the axle. When the bicycle is folded, the handle, wheels, and the saddle are stored in the frame. Here, in addition to bicycles, collapsible electric two wheelers have also been developed.

CITATION LIST

Patent Literature

Patent Literature 1: JP Hei 8-290791A
Patent Literature 2: JP 2002-504461A

SUMMARY OF THE INVENTION

Problems to be Solved by the Invention

However, with the structure as disclosed in Patent Literature 1, since the two wheels (namely, the front wheel and the rear wheel) are overlapped, the size in the width direction would become large. In addition, the saddle, handle and the wheels would protrude outside the frame. Accordingly, the structure of Patent Literature 1 was not always suitable for carrying and storing. In addition, the protrusion from the frame requires more room for storage, and would also result in a dead space formed above the bicycle. Since the driving section such as the chain and the like are exposed, the surroundings can get stained by the oil and the like.

On the other hand, the one disclosed in Patent Literature 2 stores the handle, saddle, and wheels in the frame, however, both of the front wheel and the rear wheel are stored by allowing the wheels to pivot inwardly. Accordingly, the diameter of the wheels need to be made small so that the wheels do not interfere with each other when stored. Therefore, the wheels are easily influenced by the road surface, thereby being unstable and having difficulty in achieving high driving performance. In addition, when the operation of folding is conducted, the rear wheel need to be stored first due to structural reasons. Accordingly, the rear wheel side of the main body need to be raised by using the front wheel as a support. Since the front wheel shakes, it was far from being capable to easily store the rear wheel to the inner most upper portion of the frame while using the front wheel as a support.

The present invention has been made by taking the aforementioned circumstances into consideration. An object of the present invention is to provide a thin collapsible two-wheeled vehicle, which can store the wheels, saddle, handle and the like into the storage room provided in the frame when the two-wheeled vehicle is in the collapsed state, the folding of the vehicle being accomplished by a simple operation.

Means to Solve the Problem

According to the present invention, a collapsible two-wheeled vehicle structured with a front wheel, a rear wheel; a saddle; a handle; a main body frame integrally formed as a thin box-shape to support the front wheel, the rear wheel, the saddle, and the handle, comprising: a pair of left and right mounting members provided to the main body frame to mount the rear wheel; wherein: the pair of mounting members are each provided with a through hole penetrating each of the pair of mounting members respectively in left and right directions of the mounting members; the main body frame has a storage room therein, the storage room capable of storing the front wheel, the rear wheel, the saddle, and the handle; the rear wheel has an axle capable of moving within the through hole between a first mounting position and second mounting position; and the rear wheel protrudes from the main body frame when the axle is mounted at the first mounting position, and the rear wheel is stored in the main body frame when the axle is mounted at the second mounting position.

According to such constitution, a thin collapsible two-wheeled vehicle, which can store the front wheel, rear wheel, saddle, handle and the like into the storage room provided in the frame when the two-wheeled vehicle is in the collapsed state, the folding of the vehicle being accomplished by a simple operation, is provided. Especially, the rear wheel of the collapsible two-wheeled vehicle according to the present invention can be stored in the storage room R by a simple operation of moving an axle from a first mounting position to a second mounting position provided in the penetrating holes.

Hereinafter, various embodiments of the present invention are exemplified. The embodiments provided hereinafter can be combined with each other.

Preferably, the through hole is a long hole elongating in an approximately vertical direction; the axle is capable of sliding within the long hole: and the first mounting position is a lower end side of the long hole, and the second mounting position is an upper end side of the long hole.

Preferably, the lower end side of the long hole is bent forwardly; and a frontward end of the lower end side of the long hole is the first mounting position.

Preferably, the main body frame comprises an upper frame, a lower frame, a front frame, a rear frame, and a pair of X-shaped reinforcement frames, the pair of X-shaped reinforcement frames connecting each of intersections with each other, the intersections being made with the upper frame, the lower frame, the front frame, and the rear frame; and each of the mounting members is installed at a rearward position of each of the pair of reinforcement frames, respectively.

Preferably, the saddle comprises a left side section and a right side section, each of the left side section and the right side section configured so as to be capable of being folded; and a seat of the left side section and a seat of the right side section are made substantially parallel with the main body frame so as to allow the saddle to be stored in the main body frame.

Preferably, the handle and the front wheel are mounted to the front frame via a front fork; the front fork comprises a steering column connected to the handle, a blade to support the front wheel, and a connecting member to connect the steering column and the blade, the steering column and the blade being connected by the connecting member so as to pivot with respect to each other; and the front wheel is stored into the main body frame by allowing the connecting member to pivot with respect to the steering column and allowing the blade to pivot with respect to the connecting member.

Preferably, a first opening provided in an upper portion of the main body frame, the first opening serving as an inlet or outlet of the saddle and the handle; a second opening provided in a lower portion of the main body frame, the second opening serving as an inlet or outlet of the front wheel and the rear wheel; and a covering member to detachably cover the main body frame; wherein: the covering member has an attaching opening at a lower side of the covering member to attach the covering member to the main body frame and an upper opening positioned so as to correspond to the first opening; and the collapsible two-wheeled vehicle can be rode with the covering member being attached.

Preferably, the main body frame has a width of 120 mm or less.

In addition, according to another aspect of the present invention, a collapsible two-wheeled vehicle structured with a front wheel, a rear wheel; a saddle; a handle; a main body frame integrally formed as a thin box-shape to support: the front wheel, the rear wheel, the saddle, and the handle, comprising: a first opening provided in an upper portion of the main body frame, the first opening serving as an inlet or outlet of the saddle and the handle; a second opening provided in a lower portion of the main body frame, the second opening serving as an inlet or outlet of the front wheel and the rear wheel; and a covering member to detachably cover the main body frame; wherein: the main body frame has a storage room therein, the storage room capable of storing the front wheel, the rear wheel, the saddle, and the handle; the covering member has an attaching opening at a lower side of the covering member to attach the covering member to the main body frame and an upper opening positioned so as to correspond to the first opening; and the collapsible two-wheeled vehicle can be driven with the covering member being attached.

DESCRIPTION OF EMBODIMENTS

Hereinafter, embodiments of the present invention will be described. The features described in the following embodiments can be combined with each other. In addition, each of the features can independently constitute an invention.

Figure 1:
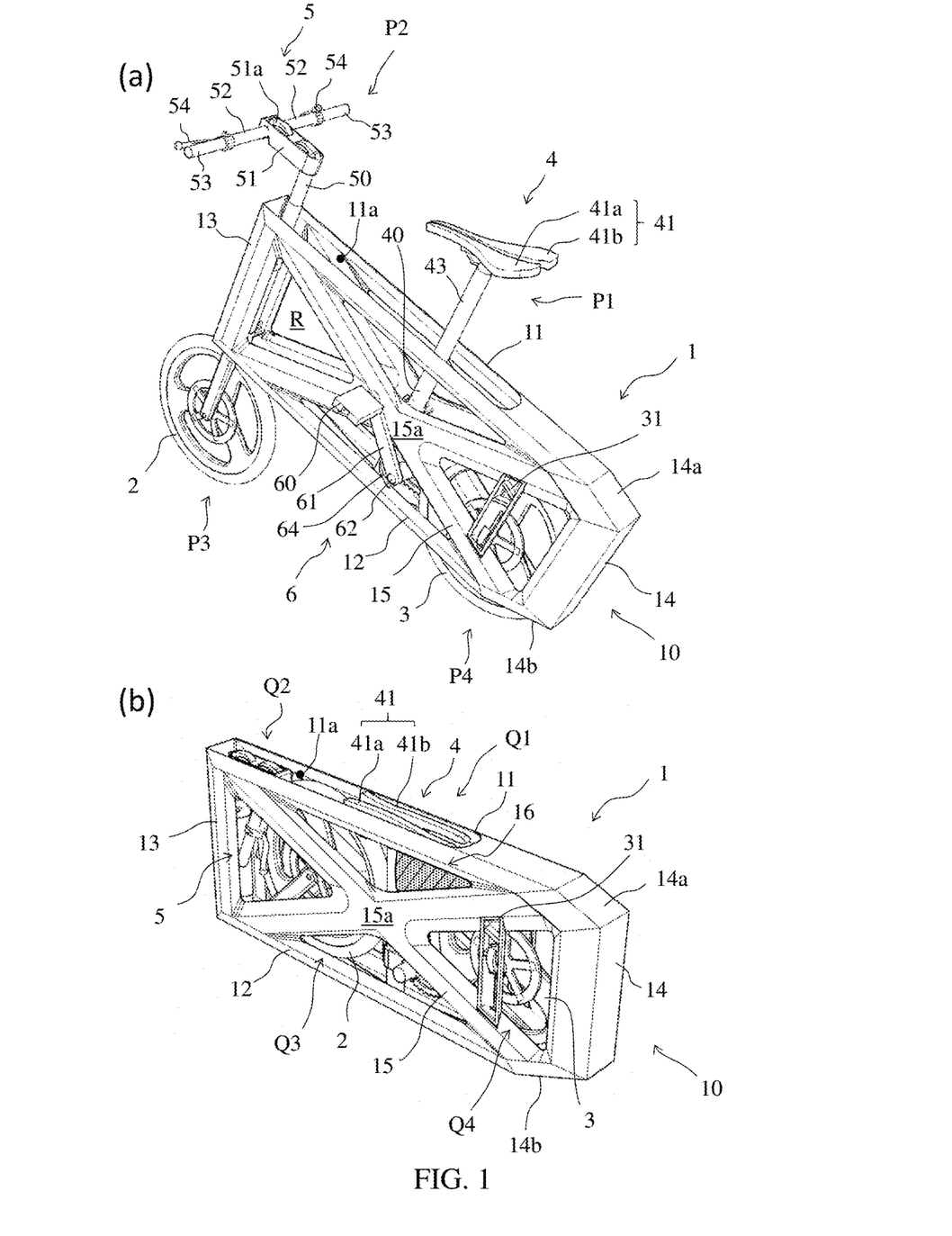
FIG. 1 is a perspective view showing a collapsible bicycle according to an embodiment of the present invention in a driving state and in a stored state.
Figure 2:
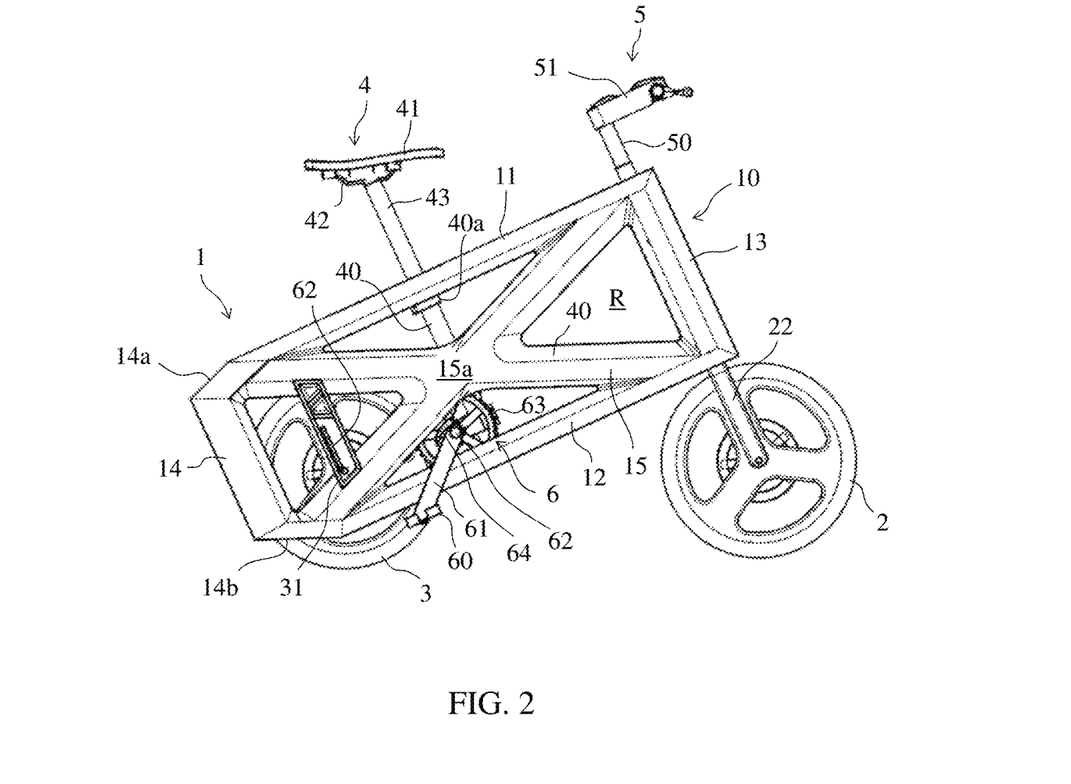
FIG. 2 is a side view of the collapsible bicycle of FIG. 1, in the driving state.
Figure 7:
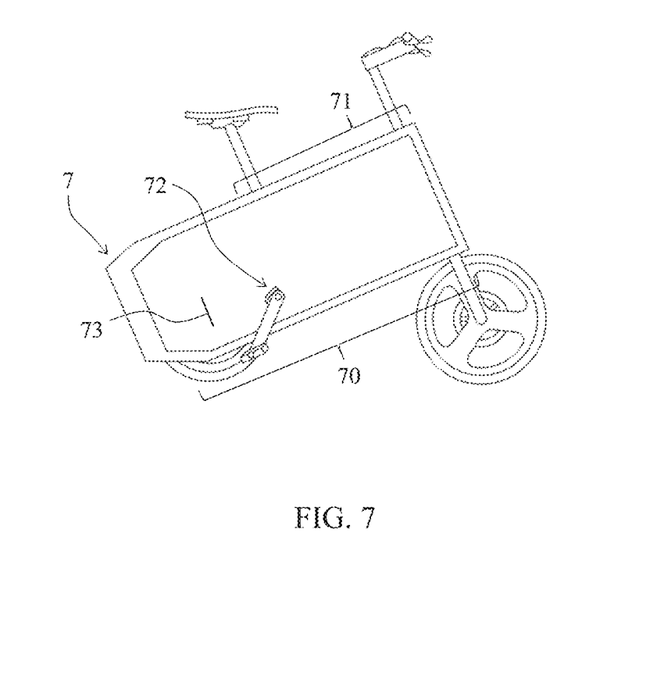
FIG. 7 is a schematic view of the collapsible bicycle of FIG. 1 in a state where a covering member is applied to the main body frame.

The collapsible bicycle shown in FIGS. 1 and 2 as the collapsible two-wheeled vehicle according to one embodiment of the present invention is structured with a main body frame 1 having a thin and rectangular solid shape, the main body frame provided with a storage room R; and wheels (front wheel 2, rear wheel 3), a saddle 4, a handle 5, and a driving section that are mounted onto the main body frame 1; and constitutes a monocoque structure. The form of the collapsible bicycle can be changed from the driving state (refer to (a) of FIG. 1) to the stored state (refer to (b) of FIG. 1), by storing the front wheel 2, rear wheel 3, saddle 4, handle 5, and the driving section 6 in the storage room R. In addition, as shown in FIG. 7, a covering member 7 can be applied onto the main body frame 1 of the collapsible bicycle of the present embodiment. Hereinafter, specific structures of the collapsible bicycle will be explained.

As shown in FIGS. 1 and 2, an outer frame 10 comprising an upper frame 11, a lower frame 12, a front frame 13 and a rear frame 14; and a pair of X-shaped reinforcement frames 15 are integrally formed to structure the main body frame 1. These frames form the storage room R. In order to achieve thin profile and to save weight, it is preferable to form the frame as an integrally formed CFRP frame, using carbon fibers. Here, the frame can be formed as a pipe frame or as a plastic frame, and can be formed as a metal frame formed by cutting aluminum and the like. Here, arbitrary materials can be used so as it can provide strength required for a bicycle.

The upper frame 11 elongates from the front frame 13 to a rearward position of the saddle 4, and is provided with an approximately rectangular first opening 11a penetrating the upper frame 11 in the thickness direction. Here, the saddle 4 and the handle 5 are each capable of moving within the driving positions P1 and P2 and the storing positions Q1 and Q2, respectively. In the driving position, the saddle 4 and the handle 5 protrude above the main body frame 1 through the opening 11a, and in the storing position, the saddle 4 and the handle 5 are stored in the main body frame 1.

Figure 3:
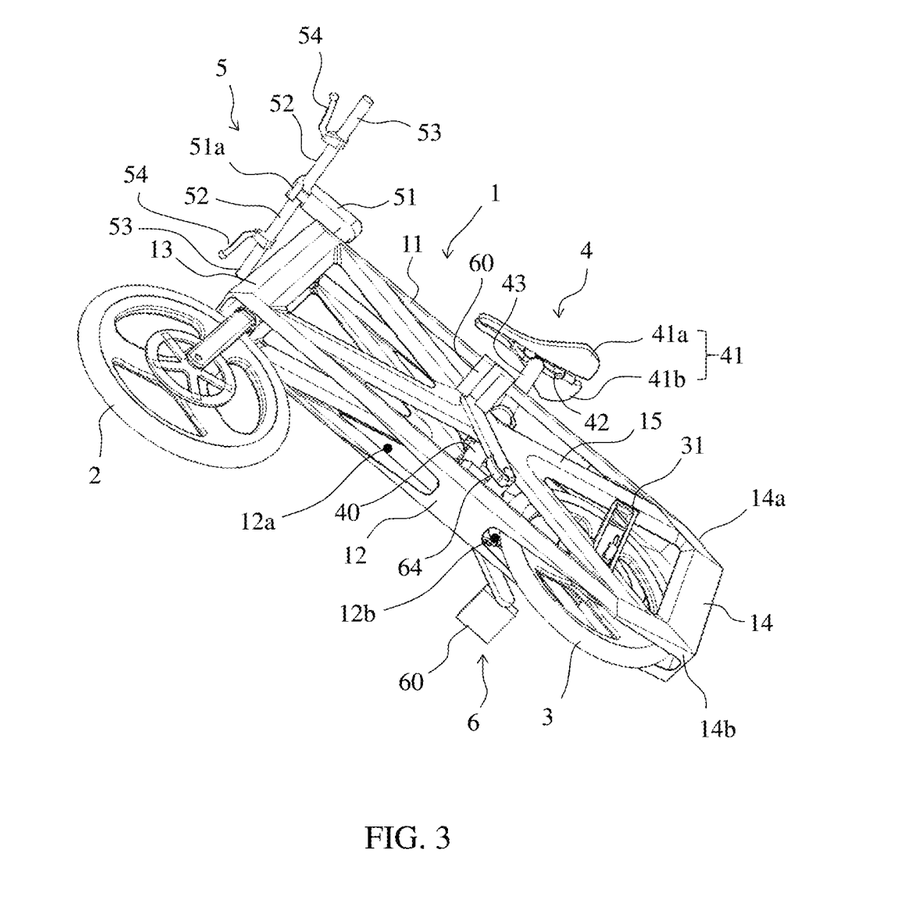
FIG. 3 is a perspective view of the collapsible bicycle of FIG. 1, in the driving state, observed from the lower side.

As shown in FIG. 3, the lower frame 12 has an opening 12a provided at the front frame 13 side, and an opening 12b provided at the rear frame 14 side, each of the openings 12a and 12b penetrating the lower frame 12 in the thickness direction. (The openings 12a and 12b are collectively referred to as a second opening.) Here, the front wheel 2 is capable of moving within the driving position P3 and the storing position Q3. In addition, the rear wheel 3 is capable of moving within the driving position P4 and the storing position Q4. In the driving position, the front wheel 2 and the rear wheel 3 protrude below the main body frame 1 through the openings 12a and 12b, respectively; and in the storing position, the front wheel 2 and the rear wheel 3 are stored in the main body frame 1 (refer to FIG. 1). When the front wheel 2 is in the driving position P3, an attached case and the like can be stored in the portion where the front wheel 2 had been stored, and the collapsible bicycle can be driven in such state.

Figure 4:
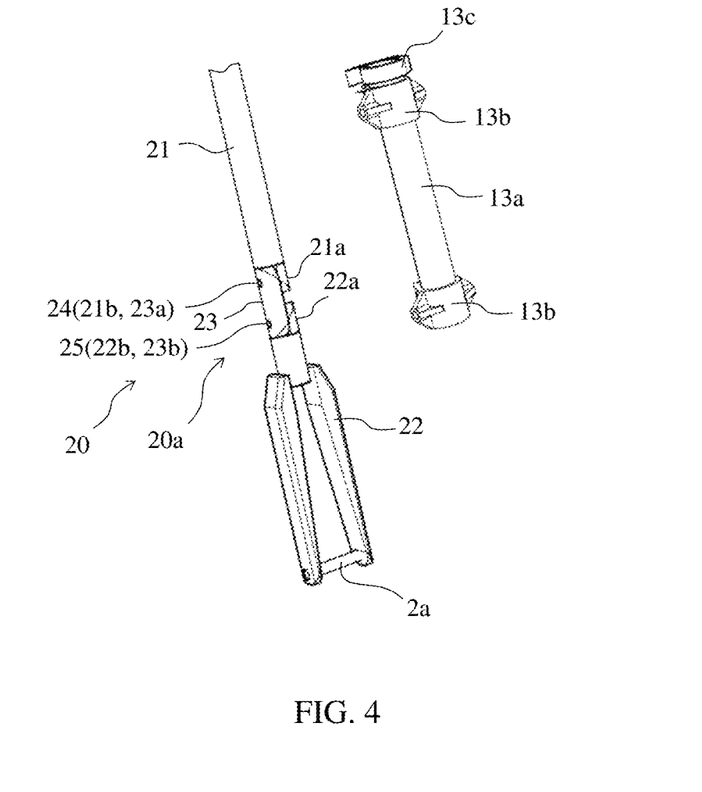
FIG. 4 is an enlarged view of a supporting pipe and a front fork of a front frame according to the collapsible bicycle of FIG. 1.

A cross section of the front frame 13 is approximately U-shaped. Inside the front frame 13, a supporting pipe 13a as shown in FIG. 4 is mounted onto the front frame 13 by the fixing member 13b. A front fork 20 is inserted in the supporting pipe 13a, and is supported by a retaining member 13c such as a bearing and a quick release clamp.

Here, as shown in FIG. 4, the front fork 20 is structured with a steering column 21 to which a handle axis 50 is connected, a blade 22 which separates at a lower portion so as to hold an axle 2a of the front wheel 2, and a connecting member 23 to connect these constituents. At the lower end of the steering column 21 and at the upper end of the blade 22, protruding members 21a and 22a, cross section of the protruding members being a semicircle, are formed, respectively. Here, through holes 21b and 22b elongating in a direction parallel with the axle 2a are provided to the protruding members 21a and 22a, respectively. In addition, the connecting member 23 is a member having a semicircle cross section, and corresponds to the protruding members 22a, 22b. Through holes 23a and 23b are provided to the connecting member 23, the through holes 23a and 23b elongating in a direction parallel with the axle 2a. Here, the flat portion of the protruding members 21a and 22a are each abutted with the flat portion of the connecting member 23, and then pin 24 is inserted into the through hole 21b and the through hole 23a, and pin 25 is inserted into the through hole 22b and through hole 23b. Accordingly, the connecting member 23 is connected so as allow the connecting member 23 to pivot with respect to the protruding member 21a and with respect to the protruding member 22a.

In the front fork 20, the afore-mentioned protruding members 21a and 22b, and the connecting member 23 structure the joint mechanism 20a. Accordingly, the blade 22 can be pivoted from the driving position P3 in which the steering column 21 and the blade 22 are linearly aligned, to the storing position Q3 in which the blade 22 is stored in the storage room R of the main body frame 1. Here, the steering column 21 and the connecting member 23 of the front fork 20 are stored within the supporting pipe 13a in the driving position P3.

A cross section of the rear frame 14 is approximately U-shaped. As shown in FIGS. 1 to 3, the rear frame 14 partially covers the rear wheel 3. In addition, a slope 14a is formed at the connecting portion of the rear frame 14 and the upper frame 11, and a slope 14b is formed at the connecting portion of the rear frame 14 and the lower frame 12.

The reinforcement frames 15 are formed so as to connect two opposing corners of the outer frame 10 with two straight lines, the outer frame 10 having an approximately rectangle shape when observed from the side, thereby forming the side surfaces of the main body frame 1. In addition, in the storage room R side of a crossing section 15a where the two straight lines of the reinforcement frame cross, a supporting pipe 40 to support the saddle 4 and the driving section 6 is mounted. In addition, at a rearward position of the reinforcement frames 15, more specifically at an approximately intermediate position between the crossing section 15a and the rear frame 14, a pair of mounting members 31 is provided to mount the axle 3a of the rear wheel 3.

As described, since the collapsible bicycle according to the present embodiment has a monocock structure structured with the outer frame 10 and the reinforcement frames 15, it can be manufactured with a small number of constituting members, and the weight can be reduced. Here, the structure of the main body frame 1 to support the wheels 2 and 3, saddle 4, handle 5, and the driving section 6 can also be referred to as a perimeter frame. In the storing room R of the main body frame 1, light, GPS, wireless communication equipment, USE charger, navigation equipment, electric assisting equipment and the like can be installed.

Figure 6:
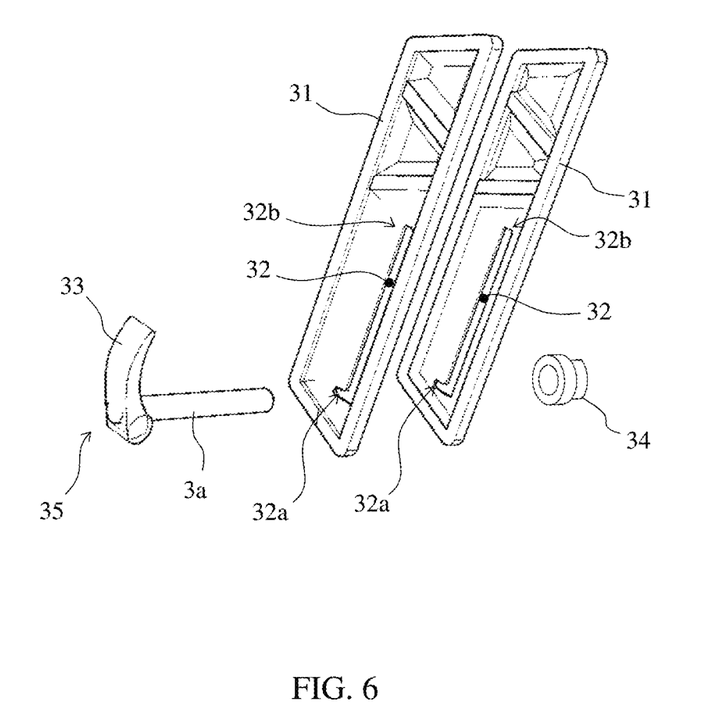
FIG. 6 is an enlarged view of a mounting member of the main body frame of the collapsible bicycle of FIG. 1.

As shown in FIG. 6, the mounting members 31 are members having an approximately trapezoid shape, base lines of the trapezoid elongating in an approximately vertical direction. The mounting members 31 are mounted so as to bridge the two lines of the reinforcement frames (refer to FIG. 2), and have long holes 32 as through holes elongating in the approximately vertical direction and penetrating the mounting member in the thickness direction. The long holes 32 are provided at a position so as to allow the axle 3a of the rear wheel 3 to slide within the long holes, and the lower end sides of the long holes 32 are bent forwardly so as to have an L-shape. Since the lower end side of the long holes 32 are bent forwardly, the axle 3a is prevented from sliding upward when riding the bicycle. In addition, the axle 3a can be easily attached and detached by using a known quick release mechanism 35 including a quick lever 33 and a bolt 34. Here, when the axle 3 is positioned at the frontward end 32a as the first mounting position at the lower end side of the long holes 32, the rear wheel 3 is positioned at the driving position P4, and when the axle 3 is positioned at the upper end 32b as the second mounting position of the long holes 32, the rear wheel 3 is positioned at the storing position Q4 (refer to FIG. 1).

Here, the thickness (a width in a left to right direction) of the main body frame 1 is preferably approximately 80 to 120 mm, and more preferably approximately 100 mm. In addition, the width of the opening 11a in the upper frame 11 and the width of the openings 12a and 12b in the lower frame 12 are each preferably approximately 60 to 100 mm, and more preferably approximately 80 mm. Here, it is preferable to make the diameter of the front wheel 2 and the rear wheel 3 as large as possible in order to improve the driving performance, so long as the front wheel 2 and the rear wheel. 3 can be stored in the storage room R of the main body frame 1. For example, wheels having a diameter of 16 inches or 18 inches are used. Further, the wheel width of the front wheel 2 and the rear wheel 3 are preferably in a range capable of allowing the wheels to go through the openings 12a and 12b, for example 75 mm. Here, in the present embodiment, a disk brake is used as the brake. When the brake section would not protrude in the width direction to interfere with the opening 12a and with the opening 12b, caliper brake, V-brake, and the like can also be used. In addition, the thickness of the main body frame 1 is approximately 100 mm, the longitudinal length and the height of the main body frame 1 are preferably approximately 1000 mm and approximately 400 mm, respectively.

Figure 5:
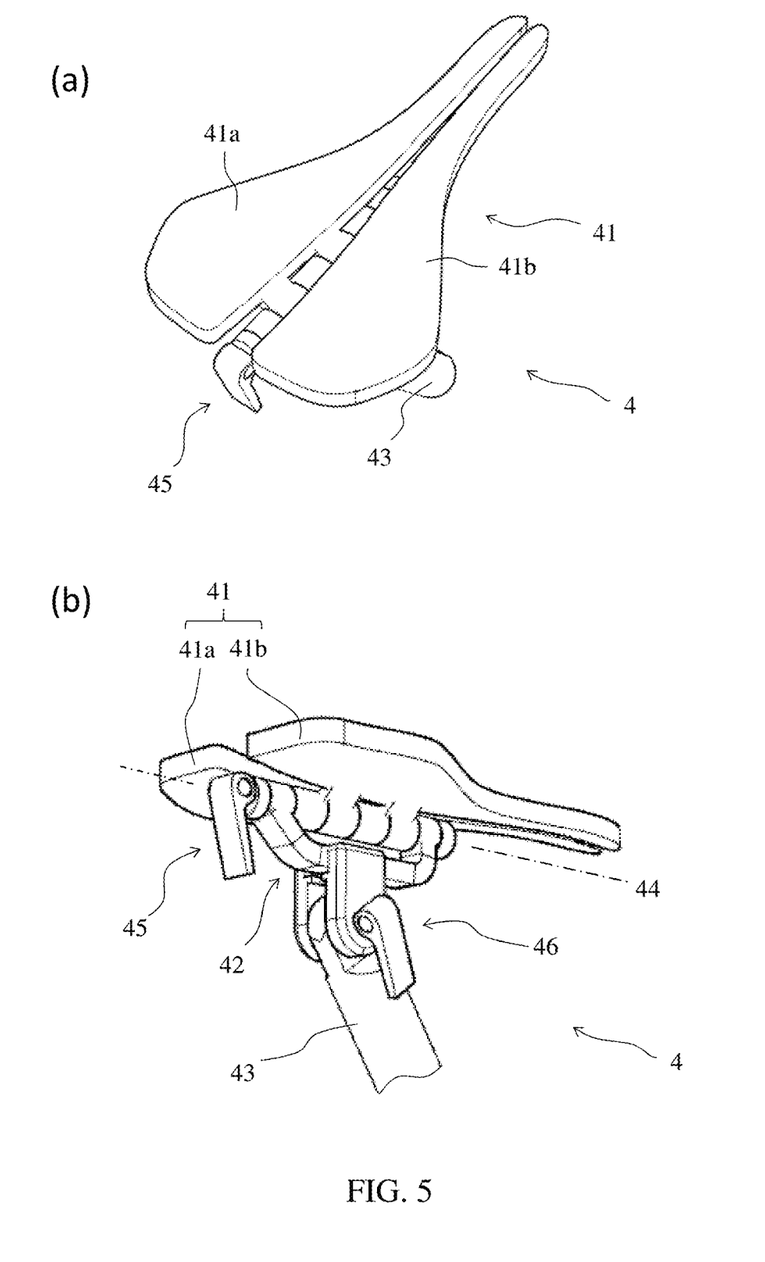
FIG. 5 is an enlarged view of a saddle section according to the collapsible bicycle of FIG. 1.

As shown in FIG. 5, the saddle 4 is mainly structured with a seat 41, a support section 42 to support the seat 41, a cylinder saddle axis 43 being connected to the support section 42 and elongating downwards. The seat 41 is structured with separate parts of a left seat 41a and a right seat 41b. The left seat 41a and the right seat 41b are each capable to pivot around a pivoting axis 44 with respect to the support section 42, and the left seat 41a and the right seat 41b can be fixed to or released from the pivoting axis by a quick release mechanism. Here, the pivoting axis 44 is provided in the longitudinal direction of the saddle 4, that is, in an approximately front-rear direction of the collapsible bicycle. Accordingly, regarding the left seat 41a and the right seat 41b, bearing surfaces thereof can be pivoted until they become approximately parallel to the side surface of the main body frame 1, thereby suppressing the width. Thus, from the driving position P1, the saddle 4 can be stored at the storing position Q1 in the main body frame 1. Here, the support section 42 of the saddle 4 is capable to pivot with respect an axis orthogonal to the pivoting axis 44 and perpendicular to the ground, thereby allowing adjustment of the seat angle. The quick release mechanism 46 is also used for fixing and releasing the angle of the saddle. Here, the saddle axis 43 is inserted into the supporting pipe 40, and is fixed by the cramp 40a.

Here, with respect to the cramp 40a, it is preferable to use a quick release type. Further, another pipe can be provided between the supporting pipe 40 and the saddle axis 43, thereby using two joints and two pipes. Such structure allows adjusting of the height of the saddle 4 by dual adjustment. Accordingly, the height of the saddle 4 can be adjusted in a wider range.

As shown in (a) of FIG. 1, the handle 5 is structured with a handle axis 50, a handle system 51 provided at an upper end of the handle axis 50, two lateral pipes 52 supported by the handle system 51, and grips 5 and brake levers 54 provided to each of the lateral pipes 52. The handle axis 50 is provided at an upper portion of the front fork 20 using a quick release cramp and the like not shown. Accordingly, the handle 5 is capable of moving in between the driving position P2 and the storing position Q2. Here, another pipe can be provided in between the handle axis 50 and the front fork 20, thereby achieving a structure allowing multi-step adjustment for the height of the handle 5. Various known techniques can be used as the mechanism for achieving such elongation, and thus detailed explanation thereof will be omitted.

The handle system 51 is structured by mounting one end side at the upper end of the handle axis 50, and supporting the two lateral pipes 52 at the other end side, the lateral pipes 52 positioned in the frontward side than the handle axis 50 in the driving state. In addition, the lateral pipes 52 can be moved from a state of elongating in a lateral direction from the other end side of the handle system 51 to a state of elongating in a downward direction of the handle system 51. As the structure for allowing such movement, a structure which allows re-arrangement of the lateral pipes 52 by a grip member 51a provided in the handle system 51, or a structure which allows pivoting movement by providing a pivoting axis can be mentioned.

The driving section 6 is mainly structured with pedals 60 provided in the middle portion of the main body frame 1, cranks 61, a crank axis 62, a sprocket 63 fixed onto the crank axis 62, and a sprocket (not shown) at the rear wheel side interlocked with the sprocket 63 via a chain (not shown). The force for pedaling the pedal 60 is transferred to the rear wheel 3, thereby driving the rear wheel 3. The driving principle of the driving section 6 is the same as general bicycles, and thus detailed explanation is omitted. The pedal 60 is detachably attached at the end portion of the crank 61 so as to be attachable and detachable. The crank 61 is detachably provided to the crank axis 62 by an attaching mechanism 64 such as a quick release cramp and the like. Here, in order to adjust the tension of the chain, a tensioner can be provided to the driving section 6. By providing the tensioner, the transition of the rear wheel 3 between the driving position P4 and the storing position Q4 can be performed smoothly.

As shown in FIG. 7, the covering member 7 has a shape approximately the same as the profile of the main body frame 1. The covering member 7 is formed with an elastic material and the like so as to cover the main body frame 1 entirely, and is provided with an attaching opening 70 at its lower portion for covering the main body frame 1 with the covering member 7. In addition, an upper opening 71 corresponding to the shape of the opening 11a of the upper frame 11 is provided at the upper portion of the covering member 7, holes 72 for allowing the crank axis 62 to path through are provided at both side surfaces, and a slit 73 for operating the quick release mechanism 35 is provided. The covering member 7 can cover the collapsible bicycle in either the stored state or the driving state, and the attaching opening 70 and the upper opening 71 can be closed by a hook and loop fastener and the like, thereby allowing improvement of the waterproof property regarding the driving section and the like.

Here, the side surface of the covering member 7 can be provided with an arbitrary pattern or with an illustration. Since the collapsible bicycle can be driven with the covering being attached thereon, a wide range of variation can be arranged so as to meet the preference of the users. In addition, by using a light reflecting cloth material as the covering member 7, observability can be greatly improved, thereby improving the safety of driving at night time.

Further, in order to improve the observability, the covering member 7 can be made with a semitransparent material, while providing a light source such as an LED light and the like in the main body frame 1, to give a constitution allowing the covering member 7 to glow indirectly.

Here, the operation performed when the afore-mentioned collapsible bicycle is collapsed from the driving state to the stored state will be explained with reference to FIG. 1 and FIG. 8. The collapsible bicycle in the driving state as shown in (a) of FIG. 1 is collapsed to the stored state as shown in (b) of FIG. 1 and (c) of FIG. 8 by the following operations. Here, the order of the operations is arbitrary, and the bicycle can be collapsed in any order.

<Storage of Saddle: P1 to Q1>

First, the left seat 41a and the right seat 41b are pivoted around the pivoting axis 44, thereby folding each of the bearing surfaces. Then, the cramp 40a is released, and the saddle 4 is turned by 180 degrees (refer to (a) of FIG. 8) and then the saddle axis 43 is shrunk, thereby storing the saddle axis 43 in the supporting pipe 40. Then, the cramp 40a is tightened again in a state where the saddle 4 is stored in the storing room R (refer to (b) of FIG. 8).

<Storage of Handle: P2 to Q2>

Figure 8:
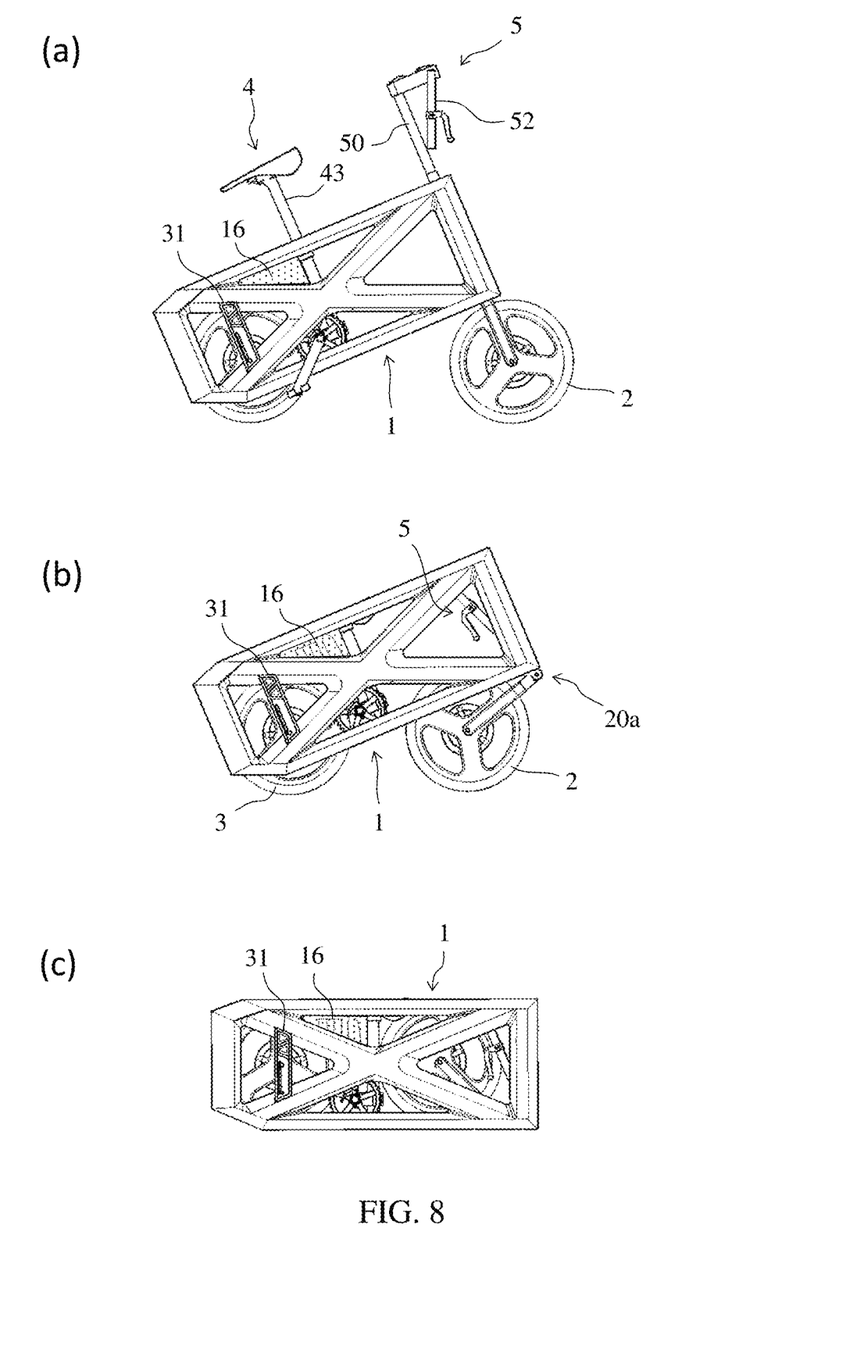
FIG. 8 is an explanatory view showing the procedures for folding the collapsible bicycle of FIG. 1.

The grip member 51a gripping the lateral pipes 52a is released, and the lateral pipes 52a are re-arranged from a state of elongating in the lateral direction to a state of elongating in the downward direction (refer to (a) of FIG. 8). In addition, the retaining member 13c (refer to FIG. 4) is released, and then the handle 5 is turned by 180 degrees, and the handle axis 50 is shrunk to house the handle axis 50 in the steering column 21 and in the supporting pipe 13a (refer to FIG. 4). Then, in a state where the handle 5 is stored in the storing room P (refer to (b) of FIG. 8), the retaining member 13c is tightened again. Here, when the retaining member 13c is released, the front fork 20 becomes capable of moving in a downward direction with respect to the supporting pipe 13*a* (refer to (b) of FIG. 8).

<Storage of Handle: P3 to Q3>

When the retaining member 13*c* (refer to FIG. 4) is released and the front fork 20 is moved in a downward direction with respect to the supporting pipe 13*a*, the joint mechanism 20*a* protrudes below the supporting pipe 13*a* (refer to (b) of FIG. 8). The blade 22 is folded in this state, thereby storing the front wheel 2 in the storing room P. Here, in the state shown by (b) of FIG. 8, the connecting member 23 is pivoted in the forward direction with respect to the steering column 21. Accordingly, since the connecting member 23 (refer to FIG. 4) can be pivoted once in the forward direction, the front wheel 2 can be prevented from interfering with the supporting pipe 40 and with the driving section 6 during the storing operation. Therefore, the diameter of the front wheel 2 can be made large, while suppressing the longitudinal length of the main body frame 1. In addition, the lateral pipes 52 of the handle 5 in the storing position Q3 is arranged at the outer side of the front wheel 2, and thus the lateral pipes 52 would not interfere with the front wheel 2.

<Storage of Rear Wheel: P4 to Q4>

As shown in FIG. 6, the quick lever 33 is pulled to unfix the axle 3*a* at the frontward end 32*a* of the long hole 32, and then the axle 3*a* is slid in the upper direction to the upper end 32*b* of the long hole 32. Subsequently, the quick lever 33 is pressed to fix the axle 3*a*. Here, in the present embodiment, the rear wheel 3 can be moved from the driving position P4 to the storing position Q4 merely by sliding the axle 3*a* along the long hole. Accordingly, the rear wheel 3 can be stored more easily compared with the constitution disclosed in Patent Literature 2.

<Storage of Pedal, Crank, and Crank Axis>

The left and right pedals 60 are detached from the cranks 61, and the left and right cranks 61 are detached from the crank axis 62 by releasing the attaching mechanism 64, thereby dismantling into two pedals 60, two cranks 61 and the crank axis 62. Here, in the upper portion of the storage room R positioned in the rearward side of the supporting pipe 40, a bag-shaped storing member 16 (refer to FIG. 8) is provided. The detached pedals 60, cranks 61, crank axis 62 and the like are stored in the storing member 16.

By the afore-mentioned operations, the saddle 4, handle 5, front wheel 2, rear wheel 3 and driving section 6 can be stored in the storage room R of the main body frame 1 having a thin box-shape. Accordingly, the main body frame 1 would not have any external protrusion. By such constitution, the collapsible bicycle according to the present embodiment in the stored state is packed into a substantially thin rectangular solid shape, thereby allowing convenient carriage as well as storage in a gap without damaging other objects. Therefore, a plurality of collapsible bicycles can be aligned compactly. In addition, since the integration density is high even when the plurality of collapsible bicycles are stored in a limited space, the collapsible bicycles can be kept in an office as a stockpile for people who are unable to return home after disasters.

Here, when the collapsible bicycle according to the present embodiment is carried, the collapsible bicycle can be rolled with the rear wheel 3 being kept out. Therefore, the collapsible bicycle according to the present embodiment can be rolled with a wheel having a larger diameter compared with the case disclosed in Patent Literature 2 in which an auxiliary wheel is provided separately. Accordingly, since another element need not be provided, the weight of the collapsible bicycle can be prevented from being increased.

Here, when each of the elements of the collapsible bicycle in the stored state is re-arranged into the driving state, procedures as mentioned above should be carried out inversely. Here, the order of the operations is arbitrary, and can be carried out in any order.

Figure 9:
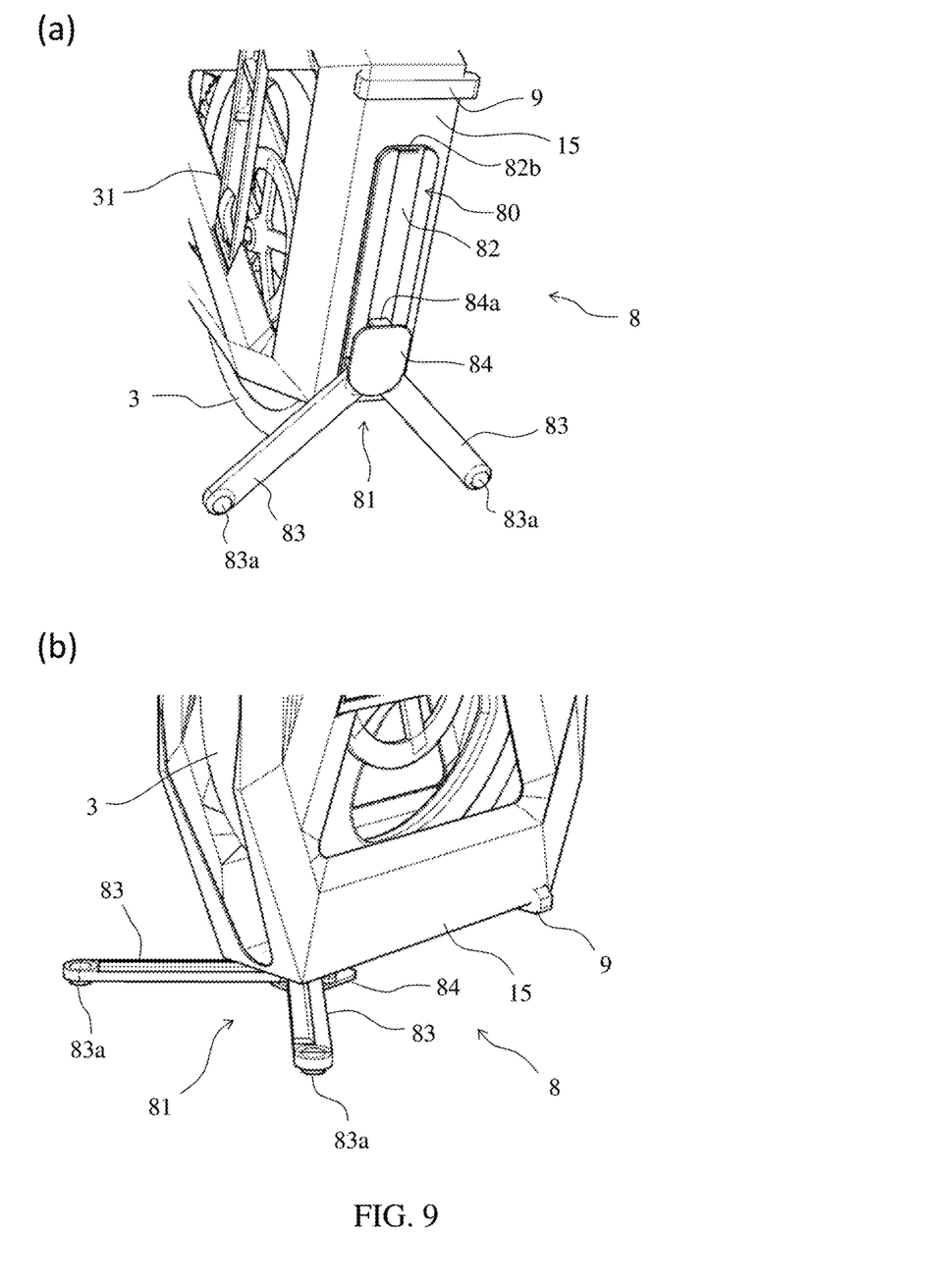
FIG. 9 is a perspective view showing a stand of the collapsible bicycle according to a modified example of an embodiment of the present invention.
Figure 10:
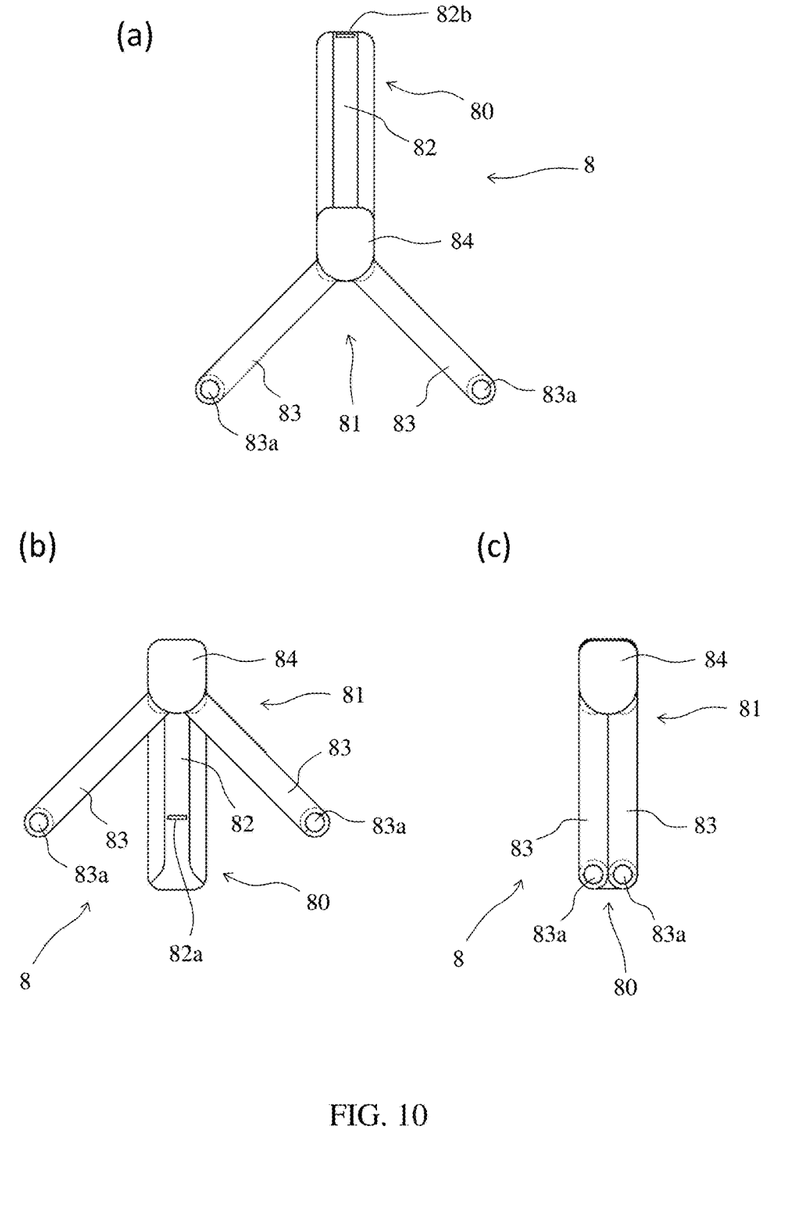
FIG. 10 is an explanatory view showing a used state and a stored state of the stand of FIG. 9.

Here, in the rear portion of the collapsible bicycle of the present embodiment, a stand 8 as shown in FIGS. 9 and 10 can be installed. This stand 8 can support the collapsible bicycle in an upright state, and is structured with a fixing section 80 fixed to a rearward portion of the rear frame 14 and a movable section 31 capable of sliding vertically along the fixing section 80. In the upper portion of the stand 8 and on the rearward side of the rear frame 14, a supporting bar 9 (refer to FIG. 9) elongating in a left to right direction is provided.

The fixing section 80 is a member elongating vertically having a thin and approximately rectangular solid shape. A slide groove 82 elongating from the upper end to the lower end of the fixing section 80 is provided, the slide groove 82 being opened in the rearward direction. In addition, at the upper portion and the lower portion of the slide groove 82, lock holes 82*a* and 82*b* are provided. Further, the movable section 81 is provided with two stand legs 83 elongating downwards, and a retaining member 84 to retain these stand legs 83. Accordingly, the movable section 81 can slide vertically within the slide groove 82. In addition, a locking piece 84*a* protruding towards the fixing section 80 is provided to the retaining member 84. The locking piece 84*a* can restrict the vertically sliding movement of the movable section 81 by locking the locking piece 84*a* into the lock holes 82*a* and 82*b* of the slide groove 82. One end side of the two stand legs 83 are pivotally supported by an axis inside the retaining member 84 (not shown). The stand legs 83 can open and shut between an opened state as shown in (b) of FIG. 10 in which the stand legs 83 are opened in the left or right direction by approximately 45 degrees, and a closed state as shown in (c) of FIG. 10 in which the stand legs 83 are closed in a downward direction. In addition, at the other end side of the stand legs 83, protruding sections 83*a* protruding in a rearward direction are provided.

The collapsible bicycle according to the present embodiment is provided with the 8 stand having such constitution. Accordingly, in the driving state as shown in (a) of FIG. 9, the collapsible bicycle is supported by the front wheel 2, rear wheel 3, and the end portions of the two stand legs 83; and in the stored state as shown in (b) of FIG. 9, the collapsible bicycle is supported by the protruding sections 83*a* of the two stand legs 83, rear surface of the retaining member 84, and the supporting bar 9, thereby allowing to store the upright in a vertical direction.

Here, the present invention can also be carried out by the following embodiment.

In the afore-mentioned embodiment, bicycle as one form of a two-wheeled vehicle was explained. Here, the present invention can be applied to an electric two-wheeled vehicle without a crank.

In the afore-mentioned embodiment, the reinforcement frames had an X-shape. Here, other shapes can be adopted so long as strength can be secured. For example, the side surface can be covered approximately entirely. In addition, the reinforcement frames need not be provided, and the main body frame 1 can be structured only with the outer frame 10, so long as the necessary strength can be exerted.

In the afore-mentioned embodiment, the long hole 32 formed in the mounting member 31 regarding the rear wheel 3 had an L-shape. Here, the long hole 32 can be linear or can be arc-shaped with the crank axis 62 being the center. When the long hole 32 is shaped as the arc, the tensioner need not be provided in order to prevent the chain from getting elongated when the rear wheel 3 is moved in between the driving position P4 and the storing position Q4.

Figure 11:
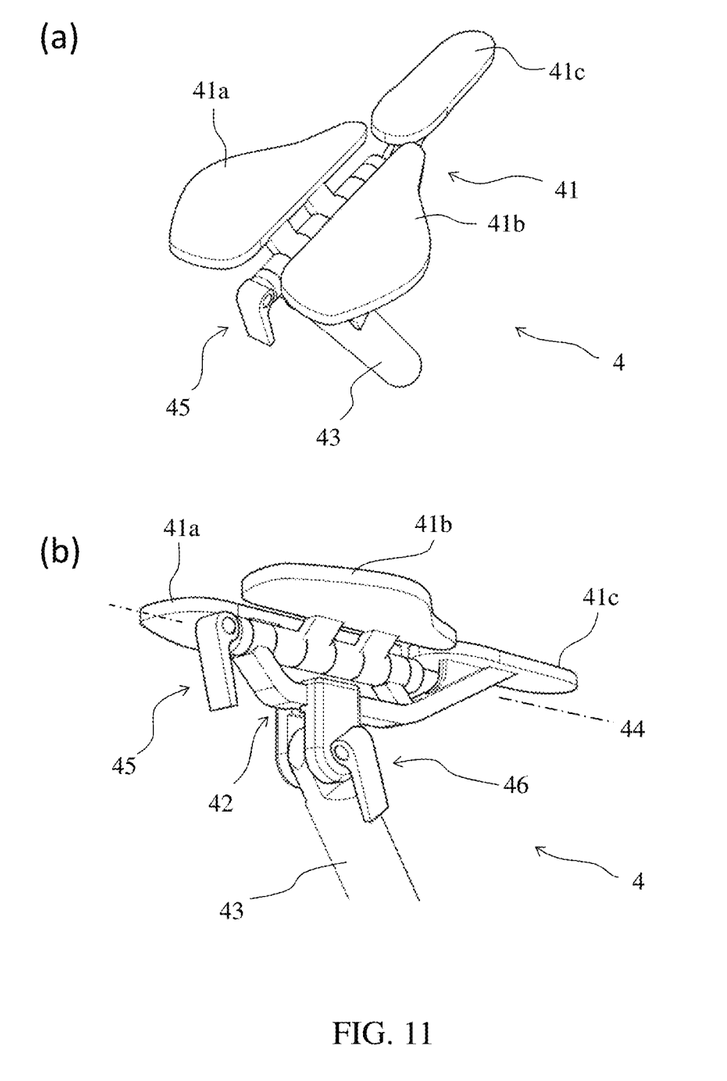
FIG. 11 is a perspective view showing a saddle of the collapsible bicycle according to a modified example of an embodiment of the present invention.

In the afore-mentioned embodiment, the seat 41 of the saddle 4 was structured with two separate elements of the left seat 41a and the right seat 41b. Here, as shown in FIG. 11, the seat 41 of the saddle 4 can be structured with three separate elements of the left seat 41a, the right seat 41b, and the front seat 41c. In such case, only the left seat 41a and the right seat 41b are pivoted, and the front seat 41c is structured so as to be fixed to the support section 42.

In addition, a material with high flexibility can be used for the seat of the saddle 4, thereby allowing storage of the seat within the main body frame 1 by bending the seat, instead of providing a pivoting axis 44.

Figure 12:
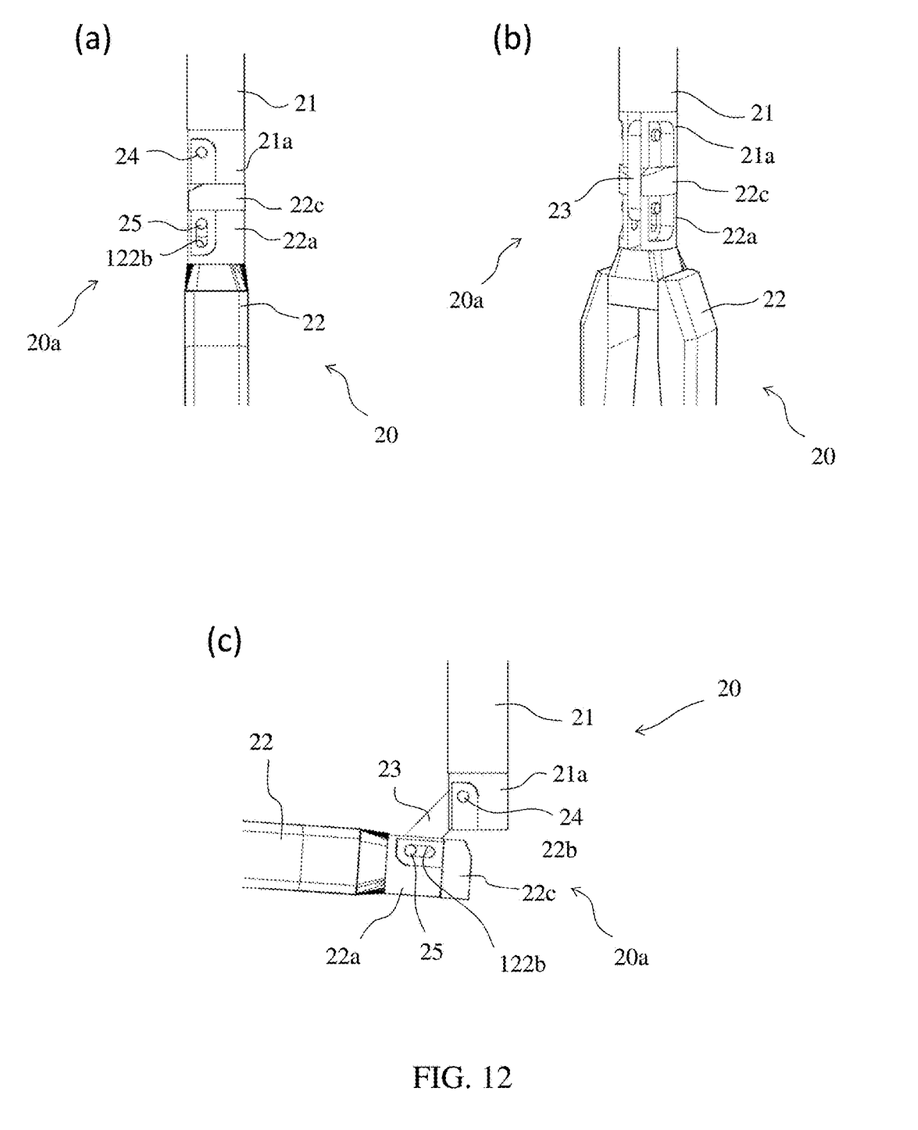
FIG. 12 is a perspective view of a front fork of the collapsible bicycle according to a modified example of an embodiment of the present invention.

In the afore-mentioned embodiment, the through hole 22b provided in the protruding member 22a of the blade 22 was a round hole corresponding to the pin 25. Here, as shown in FIG. 12, the through hole can be a long hole 122b. When the through hole in the protruding member 22a is provided as the long hole 122b, the joint mechanism 20a of this modified example can shift the blade 22 in a forward direction when performing the operation to store the front wheel 2 (refer to (c) of FIG. 12). Accordingly, the front wheel 2 can be prevented from interfering with the supporting pipe 40 and with the driving section 6. Here, at the upper end of the protruding member 22a of the blade 22 shown in FIG. 12, a cushioning member 22c having elasticity is provided. Since the cushioning member 22c is provided in between the steering column 21 and the blade 22, the cushioning member 22c can serve as a suspension of the front fork 20.

EXPLANATION OF SYMBOLS

R: storage room
1: main body frame
3: rear wheel (wheel)
3a: axle
4: saddle
5: handle
31: mounting member
32: long hole (through hole)
32a: frontward end (first mounting position)
32b: upper end (second mounting position)

The invention claimed is:

1. A collapsible two-wheeled vehicle structured with a front wheel, a rear wheel; a saddle; a handle; a main body frame integrally formed as a thin box-shape to support the front wheel, the rear wheel, the saddle, and the handle, comprising:
    a pair of left and right mounting members provided to the main body frame to mount the rear wheel;
    wherein the pair of mounting members are each provided with a through hole penetrating each of the pair of mounting members respectively in left and right directions of the mounting members;
    the main body frame has a storage room therein, the storage room capable of storing the front wheel, the rear wheel, the saddle, and the handle;
    the rear wheel has an axle capable of moving within the through hole between a first mounting position and second mounting position, wherein the axle is a rotation axis of the rear wheel; and
    the rear wheel protrudes from the main body frame when the axle is mounted at the first mounting position, and the rear wheel is stored in the main body frame when the axle is mounted at the second mounting position.

2. The collapsible two-wheeled vehicle of claim 1, wherein the through hole is a long hole elongating in an approximately vertical direction;
    the axle is capable of sliding within the long hole; and
    the first mounting position is a lower end side of the long hole, and the second mounting position is an upper end side of the long hole.

3. The collapsible two-wheeled vehicle of claim 2, wherein the lower end side of the long hole is bent forwardly; and
    a frontward end of the lower end side of the long hole is the first mounting position.

4. The collapsible two-wheeled vehicle of claim 1, wherein the main body frame comprises an upper frame, a lower frame, a front frame, a rear frame, and a pair of X-shaped reinforcement frames, the pair of X-shaped reinforcement frames connecting each of intersections with each other, the intersections being made with the upper frame, the lower frame, the front frame, and the rear frame; and
    each of the mounting members is installed at a rearward position of each of the pair of reinforcement frames, respectively.

5. The collapsible two-wheeled vehicle of claim 1, wherein the saddle comprises a left side section and a right side section, each of the left side section and the right side section configured so as to be capable of being folded; and
    a seat of the left side section and a seat of the right side section are made substantially parallel with the main body frame so as to allow the saddle to be stored in the main body frame.

6. The collapsible two-wheeled vehicle of claim 1, wherein the handle and the front wheel are mounted to a front frame via a front fork;
    the front fork comprises a steering column connected to the handle, a blade to support the front wheel, and a connecting member to connect the steering column and the blade, the steering column and the blade being connected by the connecting member so as to pivot with respect to each other; and
    the front wheel is stored into the main body frame by allowing the connecting member to pivot with respect to the steering column and allowing the blade to pivot with respect to the connecting member.

7. The collapsible two-wheeled vehicle of claim 1, further comprising
    a first opening provided in an upper portion of the main body frame, the first opening serving as an inlet or outlet of the saddle and the handle;
    a second opening provided in a lower portion of the main body frame, the second opening serving as an inlet or outlet of the front wheel and the rear wheel; and
    a covering member to detachably cover the main body frame; wherein the covering member has an attaching opening at a lower side of the covering member to attach the covering member to the main body frame and an upper opening positioned so as to correspond to the first opening; and
    the collapsible two-wheeled vehicle can be driven with the covering member being attached.

8. The collapsible two-wheeled vehicle of claim 1, wherein the main body frame has a width of 120 mm or less.

* * * * *